(12) United States Patent
Sun

(10) Patent No.: US 8,773,975 B2
(45) Date of Patent: Jul. 8, 2014

(54) NETWORK CODING ENHANCEMENTS

(75) Inventor: Li-Hsiang Sun, San Diego, CA (US)

(73) Assignee: LG Electronics Inc., Seoul (KR)

(*) Notice: Subject to any disclaimer, the term of this patent is extended or adjusted under 35 U.S.C. 154(b) by 671 days.

(21) Appl. No.: 13/009,809

(22) Filed: Jan. 19, 2011

(65) Prior Publication Data

US 2011/0176408 A1 Jul. 21, 2011

Related U.S. Application Data

(60) Provisional application No. 61/297,187, filed on Jan. 21, 2010, provisional application No. 61/354,673, filed on Jun. 14, 2010.

(51) Int. Cl.
*H04L 12/26* (2006.01)

(52) U.S. Cl.
USPC ........... 370/216; 370/252; 370/278; 370/282; 370/389

(58) Field of Classification Search
USPC ......... 370/312–315, 400, 274, 279, 252, 278, 370/282, 389; 375/211; 455/11.1, 13.1, 455/422.1
See application file for complete search history.

(56) References Cited

U.S. PATENT DOCUMENTS

| | | | | |
|---|---|---|---|---|
| 7,929,479 | B2* | 4/2011 | Youn et al. | 370/315 |
| 8,306,095 | B2* | 11/2012 | Josiam et al. | 375/211 |
| 8,315,556 | B2* | 11/2012 | Yu et al. | 455/13.1 |
| 8,416,716 | B2* | 4/2013 | Do et al. | 370/278 |
| 2007/0076877 | A1* | 4/2007 | Camp et al. | 380/255 |
| 2007/0149117 | A1* | 6/2007 | Hwang et al. | 455/11.1 |
| 2007/0184826 | A1* | 8/2007 | Park et al. | 455/422.1 |
| 2007/0280233 | A1 | 12/2007 | Bush | |
| 2008/0279135 | A1* | 11/2008 | Periyalwar et al. | 370/315 |
| 2009/0067533 | A1* | 3/2009 | Yuan et al. | 375/267 |
| 2009/0135717 | A1* | 5/2009 | Kamal et al. | 370/225 |
| 2009/0158120 | A1* | 6/2009 | Palanki et al. | 714/758 |
| 2009/0252146 | A1* | 10/2009 | Luo et al. | 370/351 |
| 2009/0268790 | A1* | 10/2009 | Josiam et al. | 375/211 |
| 2009/0285145 | A1* | 11/2009 | Youn et al. | 370/312 |
| 2010/0054141 | A1* | 3/2010 | Youn et al. | 370/252 |
| 2010/0112937 | A1* | 5/2010 | Choi et al. | 455/9 |
| 2010/0124186 | A1* | 5/2010 | Josiam et al. | 370/315 |
| 2010/0246474 | A1* | 9/2010 | Zhang et al. | 370/315 |

(Continued)

OTHER PUBLICATIONS

Zhang et al., "Cooperative Network Coding-Aware Routing for Multi-Rate Wireless Networks", IEEE Infocom 2009 proceedings, pp. 181-189, Apr. 2009.

(Continued)

*Primary Examiner* — Edan Orgad
*Assistant Examiner* — Emmanuel Maglo
(74) *Attorney, Agent, or Firm* — Lee, Hong, Degerman, Kang & Waimey

(57) ABSTRACT

A method performed by a base station is provided. The method includes receiving, at the base station, a signal containing a transmitted first signal including a network coded message and a transmitted second signal including a non-network coded message, where the second signal is transmitted according to at least one transmission parameter. The method further includes receiving, at the base station, the at least one transmission parameter and determining, by the base station, an interference to the transmitted first signal caused by the transmitted second signal, where the interference is determined using the at least one transmission parameter. The method further includes removing the determined interference from the signal to recover the transmitted first signal.

20 Claims, 16 Drawing Sheets

(56) References Cited

U.S. PATENT DOCUMENTS

| | | | |
|---|---|---|---|
| 2010/0246708 A1* | 9/2010 | Horiuchi et al. | 375/286 |
| 2010/0278153 A1* | 11/2010 | Horiuchi et al. | 370/335 |
| 2010/0302996 A1* | 12/2010 | Matsumoto et al. | 370/315 |
| 2011/0013552 A1* | 1/2011 | Ali et al. | 370/315 |
| 2011/0085585 A1* | 4/2011 | Matsumoto et al. | 375/211 |
| 2011/0110284 A1* | 5/2011 | Wu et al. | 370/312 |
| 2011/0110288 A1* | 5/2011 | Manssour | 370/315 |
| 2011/0149848 A1* | 6/2011 | Ho et al. | 370/328 |
| 2011/0164621 A1* | 7/2011 | Lee et al. | 370/400 |
| 2011/0176474 A1* | 7/2011 | Saito et al. | 370/315 |
| 2011/0182379 A1* | 7/2011 | Kim et al. | 375/268 |
| 2011/0206065 A1* | 8/2011 | Kim et al. | 370/474 |
| 2012/0044858 A1* | 2/2012 | Li et al. | 370/315 |
| 2012/0155373 A1* | 6/2012 | Yokomakura et al. | 370/315 |

OTHER PUBLICATIONS

Jin et al., "Comparison of Network Coding and Non-Network Coding Schemes for Multi-hop Wireless Networks", IEEE International Symposium on Information Technology 2006 (ISIT 2006), pp. 197-201, Jul. 2006.

* cited by examiner

NETWORK CODING ENHANCEMENTS

CROSS-REFERENCE TO RELATED APPLICATIONS

Pursuant to 35 U.S.C. §119(e), this application claims the benefit of U.S. Provisional Application No. 61/297,187 filed on Jan. 21, 2010 and U.S. Provisional Application No. 61/354,673 filed on Jun. 14, 2010, which are all hereby incorporated by reference herein in their entireties.

FIELD OF THE INVENTION

The present invention relates to telecommunications, and in particular, to wireless communications.

DESCRIPTION OF THE RELATED ART

In a mobile communications network, a mobile station (MS) can communicate with a base station (BS) via a relay station (RS). Typically, communication from the MS to the BS takes place over an uplink (UL) channel, and communication from the BS to the MS takes place over a downlink (DL) channel. In most time-division duplex (TDD) relay communication protocols, an MS may transmit a message intended for the BS to an RS in an UL sub-frame. The RS in turn transmits the message to the BS in an RS UL sub-frame. On the other hand, a BS may transmit a message intended for the MS to the RS in a DL sub-frame. The RS then transmits the message to the MS in an RS DL sub-frame.

The above relay scheme is inefficient, because the MS or the BS will have to schedule each of the uplink or downlink transmissions handled by the RS in separate sub-frames. The transmission throughput of a network implementing such a scheme is limited due to inefficient use of bandwidth (i.e., separate channels need to be used for UL and DL of relayed messages). If network coding is applied at the RS, the bandwidth usage of relay link can be reduced.

However, if the RS is configured to use multiple-user multiple-input multiple-output (MU-MIMO) technology to concurrently transmit a network coded message to one MS and non-network-coded messages to other MSs, where the messages are transmitted using different precoding vectors to avoid interference between messages that are intended for an MS and messages that are not intended for an MS, the network coded message transmitted by the RS to BS may suffer interference from other messages that are concurrently transmitted by the RS to MSs. As such, the network coded messages transmitted by the RS may not be properly decoded by the BS.

SUMMARY OF THE INVENTION

In accordance with one embodiment of the invention, a method performed by a base station includes receiving, at the base station, a signal containing a transmitted first signal including a network coded message and a transmitted second signal including a non-network coded message, where the second signal is transmitted according to at least one transmission parameter. The method further includes receiving, at the base station, the at least one transmission parameter and determining, by the base station, an interference to the transmitted first signal caused by the transmitted second signal, where the interference is determined using the at least one transmission parameter. The method further includes removing the determined interference from the signal to recover the transmitted first signal.

It is contemplated that the at least one transmission parameter includes at least a packet identifier, a precoding vector, a power allocation or a modulation coding scheme (MCS). It is contemplated that the non-network coded message is transmitted according to a precoding vector.

It is contemplated that the transmitted first signal and the transmitted second signal are transmitted by a relay station. It is further contemplated that the relay station transmits according to a multiple-user multiple-input multiple-output (MU-MIMO) transmission system.

It is contemplated that information in the transmitted second signal includes information previously transmitted by the base station to a relay station transmitting the second signal.

In accordance with one embodiment of the invention, a method performed by a base station includes receiving, at the base station, a signal containing a transmitted first signal including a network coded message and a transmitted second signal including a non-network coded message, where the second signal is transmitted according to at least one transmission parameter. The method further includes receiving, at the base station, the at least one transmission parameter and decoding the signal using the at least one transmission parameter to recover the transmitted first signal.

It is contemplated that the at least one transmission parameter is received from a relay station transmitting the second signal. It is further contemplated that the at least one transmission parameter is determined by the relay station.

It is contemplated that decoding the signal includes determining, by the base station, an interference to the transmitted first signal caused by the transmitted second signal, where the interference is determined using the at least one transmission parameter, and removing the determined interference from the signal to recover the transmitted first signal.

In accordance with one embodiment of the invention, a method performed by a relay station includes transmitting, from the relay station, a first signal including a network coded message and a second signal including a non-network coded message, wherein the first signal and the second signal form a third signal, and where the second signal is transmitted according to at least one transmission parameter. The method further includes transmitting, from the relay station, the at least one transmission parameter, where an interference to the transmitted first signal caused by the transmitted second signal is determined using the at least one transmission parameter, and where the determined interference is removed from the third signal to recover the transmitted first signal.

In accordance with one embodiment of the invention, a method performed by a user equipment (UE) or network equipment (NE) includes receiving, at the UE or NE, a bitmap including at least a first bit that is a result of an exclusive OR operation between a portion of a first message and first data which can facilitate determining information that should be network coded with the first message in a future transmission, where the UE is either a transmitter or a receiver of the future transmission, where a first receiver for the bitmap is required to receive the first message and has implicit or explicit knowledge of the first data, and where a second receiver for the bitmap has implicit or explicit knowledge of the first message and is required to receive the first data.

It is contemplated that when the UE is the transmitter of the future transmission, the method further includes determining, by the UE, the first data from the first bit in the bitmap using the first message, and identifying, by the UE, the first data associated with the first message, where the first data indicates whether the first receiver successfully received the first message. The method further includes generating, by the UE, a network coded message including a retransmitted uplink (UL) message and the first message when the first receiver has not successfully received the first message, and transmitting the network coded message.

It is contemplated that the first receiver has previously received a UL message, and where the first receiver determines the first message from the network coded message using the UL message. It is contemplated that the first receiver recovers the portion of the first message from the first data in the bitmap.

It is contemplated that when the UE is the receiver of the future transmission, the method further includes determining, by the UE, an acknowledgment (ACK) channel assignment using the first message, where the ACK channel assignment is used to notify a network that the UE has received the first message, and where an acknowledgment or a non-acknowledgement on the ACK channel is indicated using on-off keying. It is contemplated that when the UE is the receiver of the future transmission, the method further includes transmitting an ACK signal to the network according to the ACK channel assignment and receiving, at the UE, the future transmission including a network coded message, where the network coded message includes a second message to the UE and the first message.

It is contemplated that the first transmitter has previously transmitted the first message to the relay station, and where the UE determines the second message from the network coded message using the first message that was overheard, and where the first receiver determines the first message from the network coded message using the second message which it has previously transmitted to the relay station.

It is contemplated that the first receiver recovers the portion of the first message from the bitmap using data indicating whether a previous transmission from the first receiver occurred. It is further contemplated that the network generates the future transmission based on the ACK signal received by the network.

It is contemplated that the first receiver is a base station (BS).

Additional features and advantages of the invention will be set forth in the description which follows, and in part will be apparent from the description, or may be learned by practice of the invention. It is to be understood that both the foregoing general description and the following detailed description of the present invention are exemplary and explanatory and are intended to provide further explanation of the invention as claimed.

These and other embodiments will also become readily apparent to those skilled in the art from the following detailed description of the embodiments having reference to the attached figures, the invention not being limited to any particular embodiments disclosed.

BRIEF DESCRIPTION OF THE DRAWINGS

The above and other aspects and features of the present disclosure will become more apparent upon consideration of the following description of embodiments, taken in conjunction with the accompanying drawing figures.

DETAILED DESCRIPTION OF THE PREFERRED EMBODIMENTS

In the following detailed description, reference is made to the accompanying drawing figures which form a part hereof, and which show by way of illustration specific embodiments of the invention. It is to be understood by those of ordinary skill in this technological field that other embodiments may be utilized, and structural, electrical, as well as procedural changes may be made without departing from the scope of the present invention. Wherever possible, the same reference numbers will be used throughout the drawings to refer to the same or similar parts.

Figure 1A:
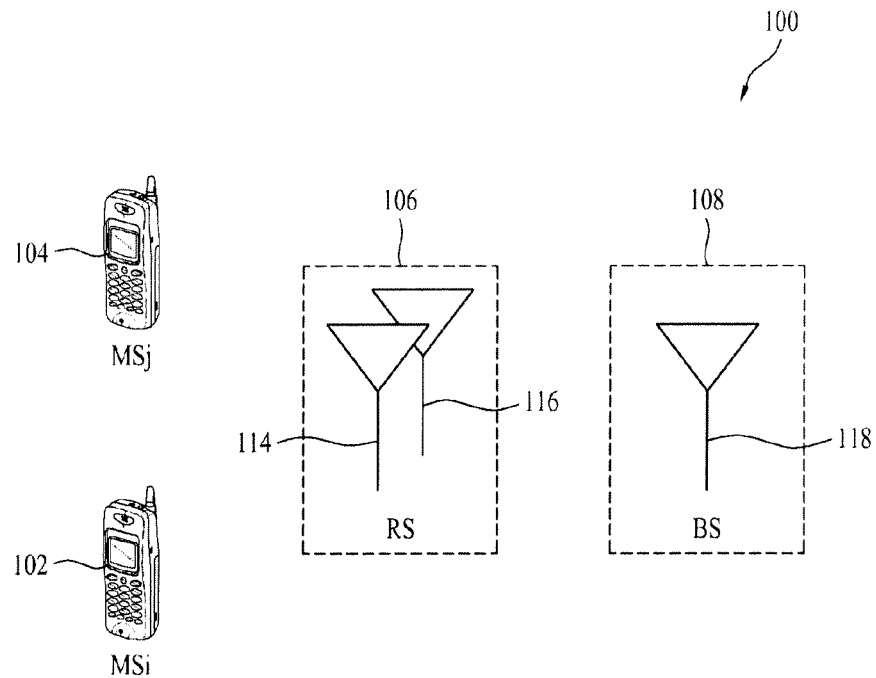
FIGS. 1A and 1B illustrate a network in accordance with one embodiment of the present invention.

FIG. 1A shows a network 100 in accordance with one embodiment of the present invention. For example, the network 100 can be a cellular network configured to use multiple-user multiple-input and multiple-output (MU-MIMO) radio transmission techniques for transmissions from a relay station (RS) to mobile stations (MSs). As shown in FIG. 1A, the network 100 includes MSi 102, MSj 104, RS 106 and base station (BS) 108.

In the embodiment of FIG. 1A, the MSi 102 and MSj 104 can each be a portable electronic device capable of wireless communications, such as a cellular telephone. The RS 106 can include at least two antennas, such as antennas 114 and 116, and the BS 108 can include at least one antenna, such as antenna 118.

Figure 1B:
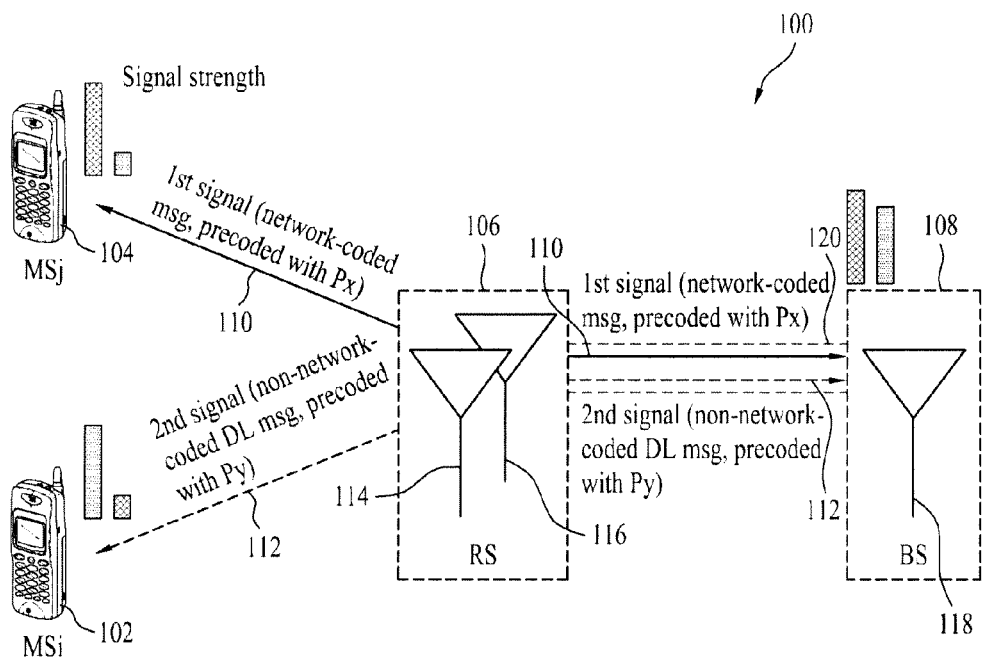

As shown in FIG. 1B, the RS 106 can be configured to transmit downlink transmissions from the BS 108 to one or more MSs in the network 100, such as the MSi 102 and the MSj 104. For example, the RS 106 can transmit a downlink message from the BS 108 to the MSi 102, such as a non-network coded message 112 shown in FIG. 1B. As shown in FIG. 1B, the non-network coded message 112 can also be received by the BS 108.

The RS 106 can also transmit downlink messages that are network-coded messages, which serve as bi-directional messages including information directed to both the BS 108 and an MS in the network 100, such as the MSj 102 or the MSj 104. For example, the RS 106 can receive an uplink message from the MSj 104 that is intended for the BS 108, and can receive a downlink message from the BS 108 that is intended for the MSj 104. The RS 106 can then generate a single message, that is, a network coded message, including both the information in the uplink message to the BS 108 and the information in the downlink message to the MSj 104. The RS 106 can then transmit the network coded message, such as the network coded message 110 in FIG. 1B, to the MSj 104 and the BS 108.

Therefore, the BS 108 has knowledge of the content in the non-network coded message 112 and the content of the downlink message used to generate the network coded message 110. However, the BS 108 does not have knowledge of the content in the uplink message used to generate the network coded message 110.

In one embodiment, each of the downlink messages transmitted from the RS 106 intended for different MSs in the network 100 are precoded by the RS 106. For example, as shown in FIG. 1B, the network coded message 110 can be precoded with a precoding vector "Px" and the non-network coded message 112 can be precoded with a precoding vector "Py." Ideally, the non-network coded message 112 precoded with the precoding vector Py should cause a negligible amount of interference to the network coded message 110 precoded with the precoding vector Px at the MSj 104. However, the non-network coded message 112 precoded with the precoding vector Py may cause a significant amount of interference to the network coded message 110 precoded with the precoding vector Px at the BS 108.

The precoding vector Px may not be the most optimal precoding vector used by the RS 106 for transmissions to BS 108. Since the relay link typically has a better channel condition than the access link, a set "P" of precoding vectors Pxs may be adequate for enabling the BS 108 to receive the transmissions from the RS 106 if there is no interference from other precoded transmissions. In one embodiment, the RS 106 only performs network coding on transmissions intended for MSs whose precoding vectors are in the set P.

With reference to FIG. 1B, when the network coded message 110 is transmitted by the RS 106, the control channel of the RS 106 also transmits information about the non-network coded message 112. For example, the information can include one or more transmission parameters, such as a packet identifier, a precoding vector, a modulation and coding scheme (MCS) and power allocation information. The packet identifier associates the non-network coded message 112 to a previous packet transmitted by the BS 108 and retransmitted by the RS 106 to an MS, such as the MSi 102.

The BS 108 caches the previously transmitted packets for both MSs that are configured to decode network coded messages, such as the MSj 104 in FIG. 1B, and MSs that are not configured to decode network coded message 112, such as the MSi 102 in FIG. 1B.

The BS 108 receives a signal 120 from the RS 106, which includes the network coded message 110 and interference caused by the non-network coded message 112. Upon receiving the signal 120, the BS 108 can use the information about the non-network coded message 112, such as the packet association, the cached packet and the precoding vector of the non-network coded message 112, to determine the interference to the network coded message 110. The BS 108 can then remove the determined interference from the signal 120 to recover the network coded message 110. The BS 108 can use the recovered network coded message 110 and the content in the downlink message that was used to form the network coded message 110 to determine the content in the uplink message in the network coded message 110.

With reference to FIG. 1A, when the RS 106 generates a network coded packet that includes both an uplink packet from an MS in the network 100, such as the MSi 102, and a downlink packet from the BS 108 to a different MS in the network 100, such as the MSj 104, the MSj 104 must have previously received and decoded the uplink packet from the MSi 102 in order for the MSj 104 to decode the network coded packet and recover the downlink packet.

Consequently, constraints may be placed on the delay of the uplink packet, the resources of the uplink control channel on the access link, the battery power of the MSj 104 and the opportunities for overhearing other uplink traffic. Such constraints may result from the fact that the RS 106 must ensure that there is an MS, such as the MSj 104, that has decoded the uplink packet from the MSi 102 before selecting one or more downlink packets to be network coded with the uplink packet from the MSi 102. Such constraints may also result from the fact that MSs that are in the mobile station group (MSG) of the MSi 102, that is, MSs that are close to MSi 102, must inform the RS 106 whether one or more of the MSs have decoded the uplink packet from the MSi 102.

In one embodiment of the present invention, with reference to FIG. 1A, the RS performs network coding, without acknowledgement (ACK) feedback messages from MSs near the MSi 102 for the uplink packets transmitted by the MSi 102. The downlink packet selection by the RS 106 is based only on an MSG report. For example, a downlink packet to the MSj 104 is selected. Therefore, by not transmitting ACK messages for any of the uplink packets received by the RS 106 from the MSi 102, no extra delays are imposed on the transmission of the uplink packets. The BS can recover the uplink packets from the network coded packets using previously cached downlink packets. The downlink packet to MSj 104 can be a delay tolerant packet, such that the RS 106 and the MSj 104 can perform additional operations to recover the downlink packet, if the uplink packet from MSi 102 has not been decoded by MSj 104.

In FIG. 1A, for example, the MSj 104 can be configured to provide a two state or three state feedback for a network-coded packet from RS 106. The two state feedback can include, for example, an ACK message or a not acknowledged (NAK) message. The three state feedback can include, for example, an ACK message, a NAK message for a failed uplink packet and a NAK message for a failed downlink packet.

Therefore, by not transmitting ACK messages for any of the uplink packets received by the RS 106, no extra delays are imposed on the transmission of the uplink packets. Furthermore, control channel overhead can be reduced since only scheduled downlink MSs that are receiving downlink packets from network-coded transmissions from RS 106 provide feedback. Since downlink-heavy MSs receive data instead of transmitting data during the majority of time, a lower burden is imposed on the battery of the MSs. In addition, opportunities for receiving and decoding more uplink packets by the MSs can be increased to create a greater potential for network coding. However, even if a downlink packet is delay tolerant, the RS 106 should still choose an appropriate downlink packet for performing network coding with an uplink packet in order to avoid losing the advantage provided by network coding.

In one embodiment of the invention, the MSj 104 in FIG. 1A can recover from a failed network coded transmission by utilizing at least one previously received transmission.

For example, if the MSj 104 fails to decode an uplink packet "x" transmitted by the MSi 102 before receiving a network coded packet "y," where the uplink packet x is needed to recover information from the network coded packet y, there may be other opportunities for the MSj 104 to recover the uplink packet x after the network coded packet y is received. Such opportunities may include reception by the MSj 104 of a hybrid automatic repeat request (HARQ) retransmission of the uplink packet x from the RS 106 to the BS 108, reception by the MSj 104 of a HARQ retransmission of the uplink packet x from the RS 106 to the MSj 104, or reception by the MSj 104 of a transmission from the RS 106 of a network coded packet generated by either network coding the HARQ retransmission of the uplink packet x with an uplink packet from the MSj 104, network coding the HARQ retransmission of the uplink packet x with a HARQ retransmission of an uplink packet of an MSk (not shown in FIG. 1A) in the network 100 which was previously decoded and stored by the MSj 104, network coding the HARQ retransmission of uplink packet x with a downlink HARQ retransmission to the MSk which was previously decoded and stored by the MSj 104, network coding the HARQ retransmission of the uplink packet x with forward link (FL) control channel blocks, or other network coding combinations described below.

In one embodiment, the MSj 104 stores any received yet undecoded samples of network coded packets, such as the network coded packet y, or uplink packets, such as the uplink packet x, for combining with any later received retransmissions of the uplink packet x, for decoding the uplink packet x, and for using x to recover the downlink packet to MSj 104 from the network coded packet y.

Figure 2:
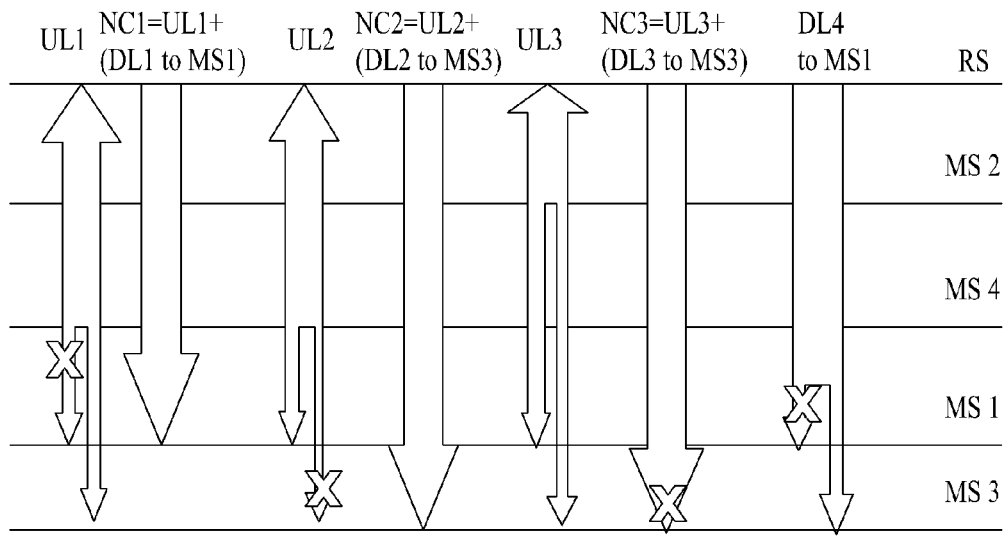
FIG. 2 illustrates the failed downlink packets and failed bi-directional network coded packets in accordance with one embodiment of the present invention.

FIG. 2 illustrates failed downlink packets and failed bi-directional network coded packets in accordance with one embodiment of the present invention. As will be described below, the RS 106 can send one transmission following multiple failed transmissions for correcting the multiple failed transmissions. For example, in the following descriptions, a network coded packet that includes a packet A and a packet B is formed by a transmitter by network coding HARQ retransmissions of the packet A and the packet B.

In FIG. 2, the RS receives uplink packets from various MSs, such as MS1, MS2, MS3 and MS4 and transmits downlink packets or network coded packets, where the network coded packets include downlink packets and the received uplink packets. For example, with reference to FIG. 2, MS1 has failed to receive the uplink packet "UL1" from MS4 and, therefore, MS1 cannot recover the downlink packet "DL1" included in the network coded packet "NC1." However, after being informed by MS1 that MS1 did not decode UL1 needed to recover DL1, the RS can transmit either another network coded packet including UL1 and uplink packet "UL2" that has already been decoded by MS1, a network coded packet including UL1 and network coded packet "NC3" that has already been decoded by MS1, or a network coded packet including UL1 and downlink packet "DL3" that has already been decoded by MS1. Similarly, if the MS1 has failed to decode packet "DL4", the RS can transmit a network coded packet including DL3 that has already been decoded by the MS1 and downlink packet "DL4," or a network coded packet including DL4 and UL2 that has already been decoded by MS1.

Therefore, the RS 106 can send one transmission, such as a network coded message, which can be used by both MS1 and MS3 to recover data in previously failed transmissions. For example, if the RS transmits a network coded message including DL3 that has already been decoded by MS1 and including DL4 that has already been decoded by MS3, MS1 can use the already decoded DL3 to recover DL4 from the network coded message and MS3 can use the already decoded DL4 to recover DL3 from the network coded message.

For example, instead of retransmitting the downlink packet DL1 after a failed transmission of the network coded packet NC1, a network coded transmission as described above can be utilized. A network coding gain can be realized since each one of the transmitted coded bits in a network coded packet can be recoded to carry at least two coded bits. The network coding can be performed outside of the bidirectional zone. MS1 can recover additional coded samples of packet UL1 from the network-coded transmission. Such recoded packets can be smaller in size in relation to a new transmission of the downlink packet DL1 or DL4 because MS1 can utilize the previously failed reception of packet UL1 and combine it with additional coded samples of packet UL1 from the network-coded transmission.

In one embodiment of the invention, an MS attempting to decode both uplink packets from and downlink packets to other MSs may store the decoded information. The MS may also attempt to decode and store downlink packets intended for other MSs after extracting coded downlink packets from network coded transmissions, if the MS has stored the required information for such extraction, such as an uplink packet used to generate the network coded packet.

In one embodiment, if a timer is associated with one or more of the decoded and stored packets, a decoded and stored packet can be deleted upon the expiration of the timer.

To generate a desirable network-coded transmission discussed above, the RS needs to determine the information needed by MS1 that has been correctly received by MS3, and the information needed by MS3 that has been correctly received by MS1. Therefore, feedbacks from MS1 and MS3 are needed.

In one embodiment, two types of FL control channels, such as type "A" ACK channel assignments and type "B" ACK channel assignments, can be used to perform the procedures described above.

An example of the abovementioned feedbacks will now be discussed. MS1 through MS(k−1) can each fail to receive either DL packets or bi-directional network coded packets from RS, before the MSk has received a packet z. The packet z can be either a DL packet or a bi-directional network coded packet intended for MSk. If MSk fails to receive the packet z, MSk then communicates back to the RS and indicates whether it has information regarding the packets that MS1 through MS(k−1) failed to receive. Such a communication back to the RS is referred to as a type "A" ACK. For example, the type "A" ACK from the MSk discussed above can indicate whether the MSk has decoded the DL packet or the UL packet contained in the network coded bi-directional packet.

Assuming MSk has information that can be used by MS1, MS3 and MS5, the RS allocates one ACK channel for each of MS1, MS3 and MS5 that can be used to communicate back to the RS to indicate whether any of MS1, MS3 or MS5 has information useful to MSk. Such communication back to the RS is referred to as a type "B" ACK. Based on the type "B" ACKs from the MS1, MS3 and MS5, the RS can generate a network-coded transmission beneficial to, for example, MSk and MS1. For example, the type "A" and type "B" ACKs discussed herein can be configured to use on-off keying, such that the transmitter of the ACK channel only signals when there is a positive acknowledgement.

In one embodiment, after the intended receiver, such as MS, receives a bi-directional network coded packet or a downlink packet "p" from a BS or RS, the MS can feed back additional information if requested by either the BS or RS and if the decoding fails. Feedback assignment techniques are discussed below. The additional information (type "A" ACK) can be, for example, a set "S0" of IDs of any of the stored packets that is either a downlink packet or an uplink packet associated with a network coded packet, and which has not been reported. The resource of type "A" ACK can be allocated at a later slot or sub-frame than the time of the 2 or 3 state ACK for the packet p, such that the network can reallocate the resources for the type "A" ACK for other uses if the packet p is positively acknowledged by the MS, In one embodiment of the invention, the BS or RS echoes an ACK/NAK message transmission according to the previously described two state or three state feedback. If a NAK message is transmitted, a set "S1" and ACK channel assignments associated with each member in the set S1 are also sent by the BS or RS. The set S1 represents all packet IDs stored by the MS known to the BS or RS and which is a downlink packet or an uplink packet associated with a network coded packet.

If an ACK message is echoed, then other MSs delete the decoded packet p if the packet p is a downlink packet and delete any stored uplink or downlink packets used to generate the packet p if the packet p is a bi-directional network coded packet.

If a NAK for a downlink packet message is echoed, that is, the intended receiver has decoded the uplink packet contained in the bi-directional network coded packet, then the other MSs delete any stored uplink packets used to generate the packet p if the packet p is a bi-directional network coded packet.

In one embodiment of the invention, other MSs transmit an ACK message for the packet p based on the type of the NAK echoed by BS or RS and the ACK channel assignment.

For example, if the BS or RS echoes an ACK message to a packet p and an MS is in the set S1, then the MS having an assigned ACK resource transmits a type "B" ACK if it has decoded the packet p in accordance with an on-off keying technique. If the BS or RS echoes an uplink packet NAK and the MS is in the set S1, then the MS ACKs if it has decoded all of one or more uplink packets used to generate the packet p if the packet p is a bi-directional network coded packet. If the BS or RS echoes a downlink packet NAK and the MS is in the set S1, then the MS ACKs if it has decoded the downlink packet used to generate the packet p if the packet p is a bi-directional network coded packet. If the BS or RS echoes an ACK, then BS or RS does not allocate ACK channel resources for a type "B" ACK.

In one embodiment, a feedback from an intended receiver MSk does not contain the additional information, such as a type "A" feedback, and BS or RS does not allocate the ACK resource for a type "B" ACK, if the packet p is successfully received by MSk.

The type "A" ACK channel assignments are additional assignments to the receiver of a network coded packet or a downlink packet and are used for signaling whether an MS has stored packets related to a failed network coded packet or a downlink packet of other MSs. For example, the set S1 can be generated based on the type "A" ACKs.

Figure 3:
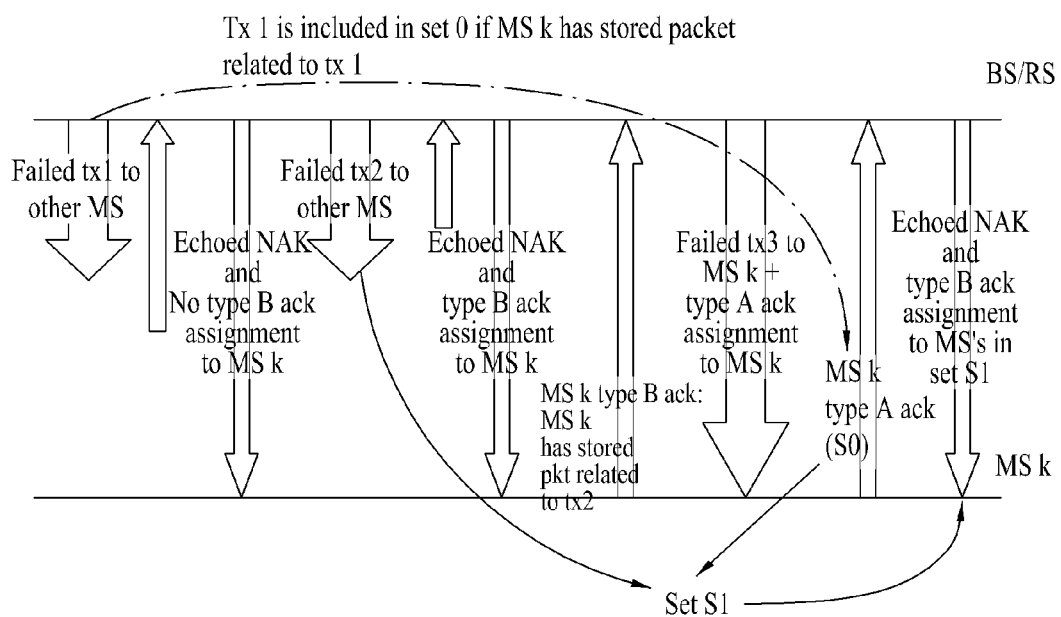
FIG. 3 illustrates an exemplary timeline of type "A" and type "B" ACKs in accordance with one embodiment of the present invention.

In one embodiment, the type "B" ACK channel assignments are for other MSs who have previously failed network coded packets or failed downlink packets and the receiver of a current network coded packet or downlink packet has indicated that it has stored packets related to their failed packets. The failed network coded packets or failed downlink packets are assigned an ID. An exemplary timeline of type "A" and type "B" ACKs are shown in FIG. 3.

In one embodiment, the type "A" ACK assignment to the MSk can also be used as parity bits of previously failed transmissions to other MSs, and the type "B" ACK assignment to the MSs in the set S1 can also be used as parity bits of the failed transmission to the MSk.

Figure 4:
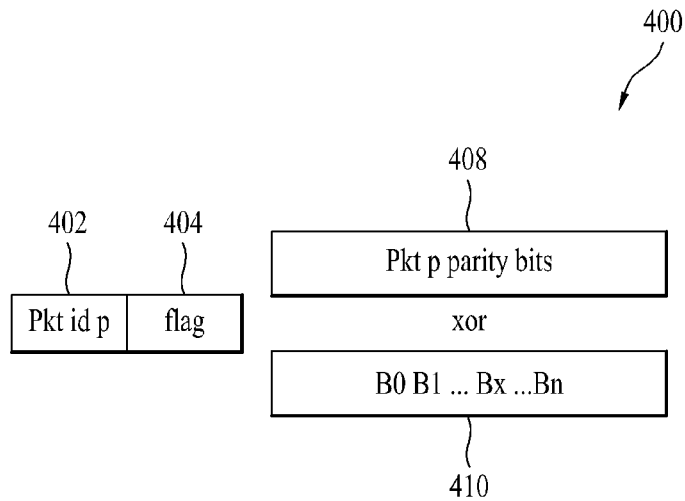
FIG. 4 illustrates a type "A" ACK assignment message in accordance with one embodiment of the present invention.

FIG. 4 illustrates a type "A" ACK assignment message 400 in accordance with one embodiment of the present invention. The type "A" ACK assignment message 400 includes an ID field 402 for indicating the ID of a packet "p" transmitted in the current or a previous sub-frame, a flag field 404 for indicating whether the receiver of the packet p is also a receiver of the downlink packet at the current slot or sub-frame (SF), and bitmap bits 410 that are exclusive OR-ed (XOR-ed) with the corresponding packet p parity bits 408. Depending on the type of echoed ACK/NAK associated with packet p, packet p parity bits 408 can also be the parity bits of the uplink packet which was used to generate a network coded packet p.

In FIG. 4. the bitmap bit "Bx" can indicate whether a type "A" ACK channel is assigned to the downlink packet receiver whose physical downlink control channel (PDCCH) block is at position "x" in the current SF. Assuming a pre-configured starting position of ACK channels associated with a packet ID, the ACK channel position of x is known from the bitmap.

In one embodiment, if a minimum assignment rule is satisfied for bit position x, the BS or RS must set the bit Bx to "1" to assign an ACK channel. For example, the network coded packet ID p has an uplink packet NAK and is generated using an uplink packet transmitted from an Mi and the PDCCH receiver at position x is or was in the MSG of the MS.

If a minimum non-assignment rule is satisfied for bit position x, the BS or RS must set the bit Bx to "0" to not assign an ACK channel. For example, the downlink packet ID p has a less robust MCS than the MCS assigned to the PDCCH receiver at position x.

The BS or RS is free to set the bit value of the bitmap if none of the minimum criteria are satisfied.

When a type "A" ACK assignment is received at the PDCCH receiver, if an MS at bit position x has stored information related to the packet p, then the MS can correctly find its ACK channel position. One such exemplary scenario can occur when an MS has a stored uplink packet which was used to generate a network coded packet p and the network coded packet p has an uplink NAK. Otherwise, the MS ignores the assignment in accordance with an on-off keying technique.

When a type "A" ACK assignment is received at the receiver of a packet p, the receiver of the packet p can take additional parity bits from the type "A" ACK assignments if the MS at position x, that is, the PDCCH position x, satisfies the minimum assignment or non-assignment rules. For example, if the MS satisfies the non-assignment rule, the receiver of the packet p can take the bit value "0", which is then XOR-ed with the value of bit x Bx. The result of the XOR operation is an additional parity bit for the packet p. The receiver of packet p ignores parity bit x from the type "A" ACK assignments if the MS at bit position x, that is, the PDCCH position x, satisfies neither the minimum assignment nor non-assignment rules.

Figure 5:
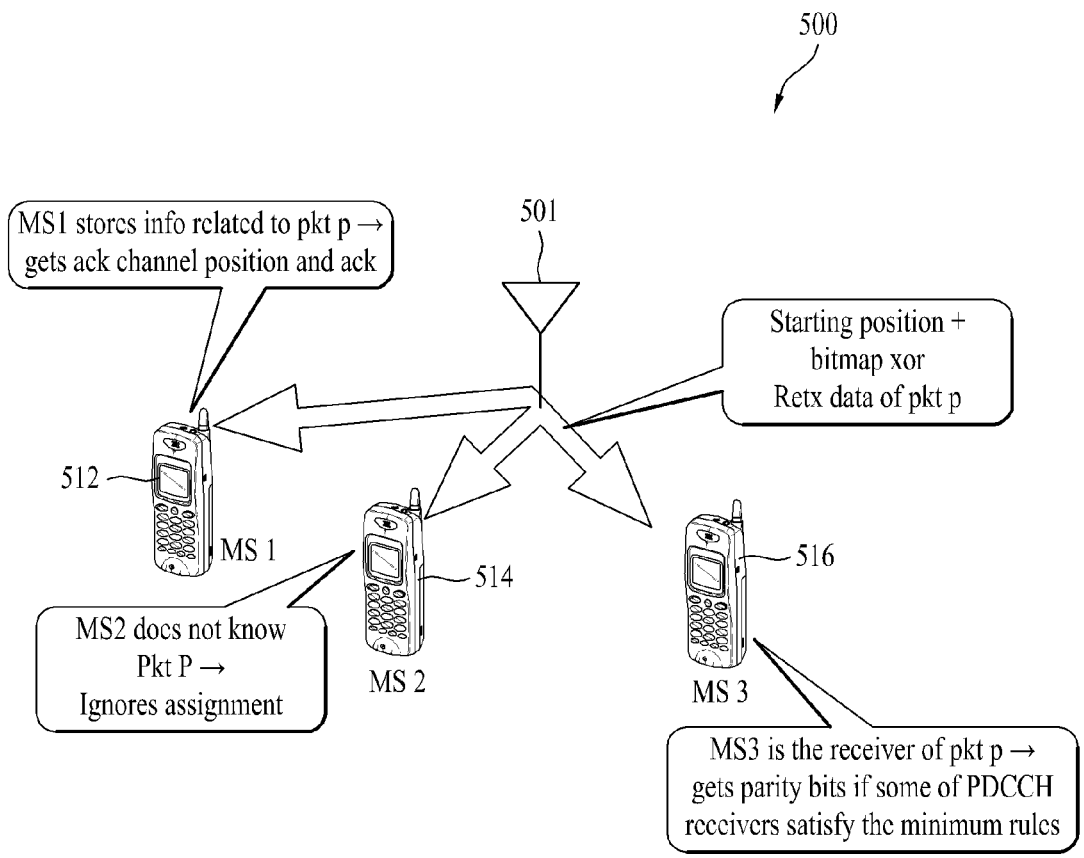
FIG. 5 illustrates a network in which an exemplary type "A" ACK channel assignment is performed in accordance with one embodiment of the present invention.

FIG. 5 illustrates a network 500 in which an exemplary type "A" ACK channel assignment is performed in accordance with one embodiment of the present invention. Network 500 includes BS 501, MS1 512, MS2 514 and MS3 516.

In FIG. 5, the BS 501 initially transmits a downlink packet p intended for the MS3 516. The MS3 516, however, fails to decode the packet p. The MS1 512 stores information related to the packet p, however, the MS2 514 does not store information related to the packet p. At the current sub-frame, downlink packets to MS1 and MS2 are scheduled, and control information, such as type "A" ACK channel assignments are also scheduled. The BS 501 transmits the control information including a starting position and a bitmap XOR-ed with retransmitted data, that is, parity bits, of packet p. The MS1 512 uses the stored information related to the packet p and the control information by the BS 501 to acquire an ACK channel position and ACK. The MS2 514, not having stored information related to the packet p, does not know the packet p and ignores the channel assignment. The MS3 516 receives the packet p and acquires parity bits if some of the PDCCH receivers satisfy the minimum rules. Therefore, the assigned ACK channel performs on-off keying.

Figure 6:
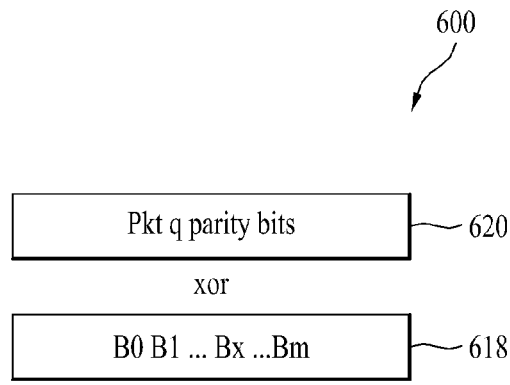
FIG. 6 illustrates a type "B" ACK assignment message in accordance with one embodiment of the present invention.

FIG. 6 illustrates a type "B" ACK assignment message 600 in accordance with one embodiment of the present invention. As shown in FIG. 6, the type "B" ACK assignment message 600 includes bitmap bits 618 that are XOR-ed with packet q parity bits 620. Each bit position of the bitmap 618 corresponds to a previously transmitted packet by the BS or RS. The bitmap bit Bx of the bitmap bits 618 indicates whether a type "B" ACK channel is assigned to the receiver of the packet with ID x, that is, whether the packet ID x is in the set S1. Assuming a preconfigured starting position associated with a packet ID, the ACK channel position of x is known from the bitmap 618. Packet q parity bits 620 are the parity bits of the currently failed transmission to the MS.

Figure 7:
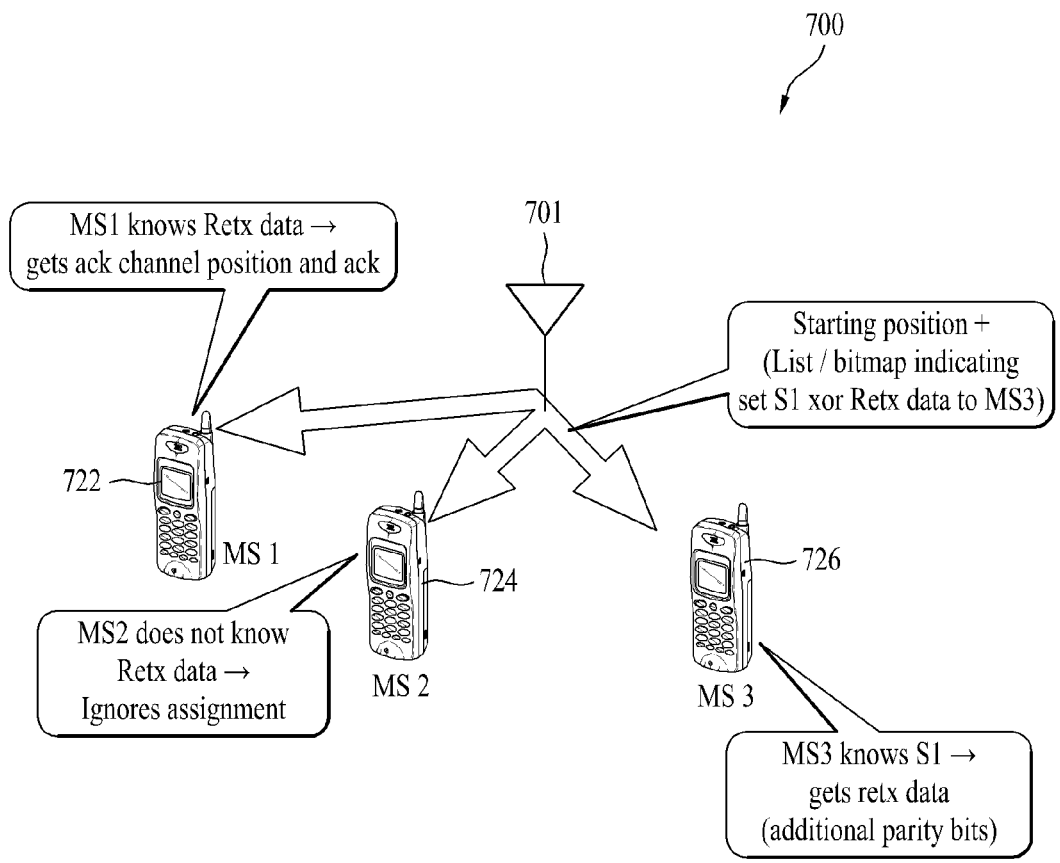
FIG. 7 illustrates a network in which an exemplary type "B" ACK channel assignment is performed in accordance with one embodiment of the present invention.

FIG. 7 illustrates a network 700 in which an exemplary type "B" ACK channel assignment is performed in accordance with one embodiment of the present invention. Network 700 includes BS 701, MS1 722, MS2 724 and MS3 726.

In FIG. 7, the BS 701 transmits data in the network 700 to MS3 726. The MS1 722 stores the data from the BS 701, however, the MS2 724 does not store the data. The BS 701 also transmits control information including a starting position and a list or bitmap indicating set "S1" that is XOR-ed with a retransmission of the data intended for the MS3 726. The MS1 722 uses the stored data and the control information by the BS 701 to acquire an ACK channel position and ACK. The MS2 724, not having stored the data, does not know the retransmitted data and ignores the channel assignment. The MS3 726 knows S1 and can acquire the retransmitted data, that is, additional parity bits of the data, in the control information. Therefore, the assigned ACK channel performs on-off keying.

Figure 8:
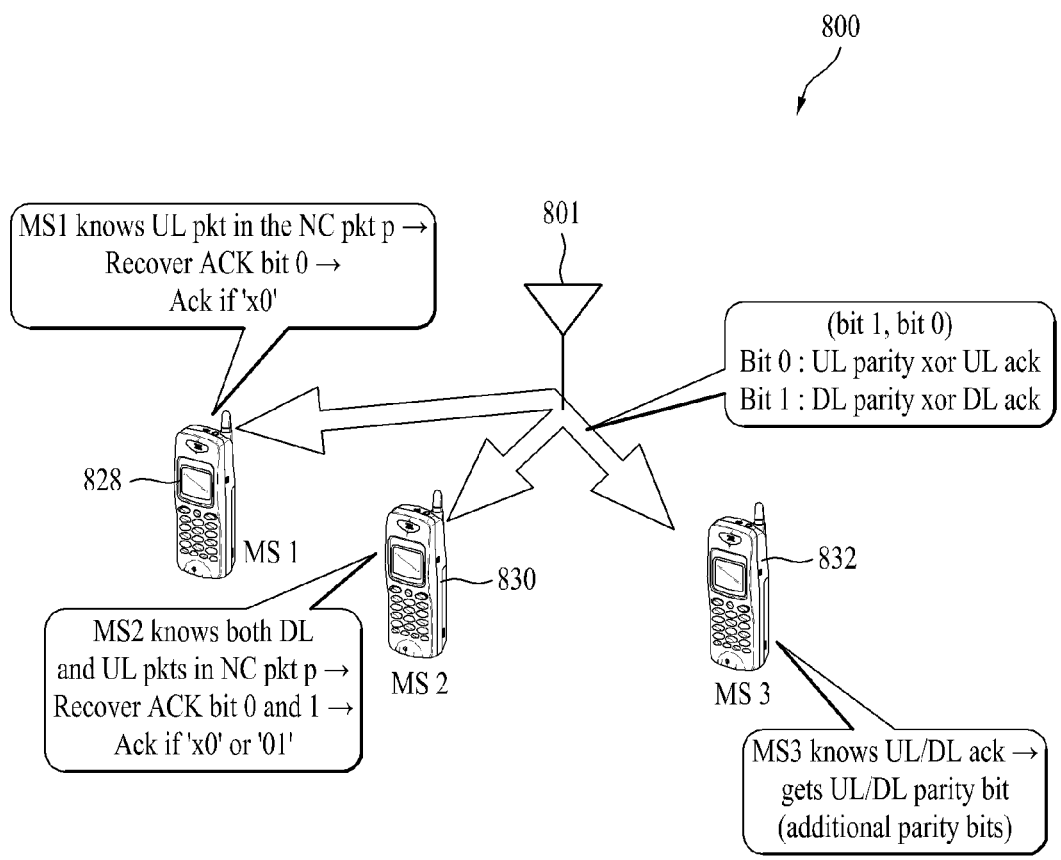
FIG. 8 illustrates a network in which an exemplary ACK/NAK echo for a bi-directional network packet is performed in accordance with one embodiment of the present invention.

FIG. 8 illustrates a network 800 in which an exemplary ACK/NAK echo for a bi-directional network packet p to MS3 832 is performed in accordance with one embodiment of the present invention. Network 800 includes BS 801, MS1 828, MS2 830 and MS3 832.

In FIG. 8, the BS 801 transmits a two-bit network coded control message (bit 1, bit 0), which can be transmitted together with the type "B" ACK channel assignment described above, where bit 0 represents an uplink parity bit that is XOR-ed with an echoed uplink ACK and where bit 1 represents a downlink parity bit that is XOR-ed with an echoed downlink ACK. The MS1 828, which had overheard the uplink packet in the network coded packet, recovers ACK bit 0 using the uplink packet and transmits a type "B" ACK if the recovered ACK bit 0 indicates a NAK. The MS1 828 discards the stored uplink packet in the network coded packet p if the recovered ACK bit 0 indicates an ACK. The MS2 830, which had overheard the network coded packet p and the uplink packet in the network coded packet p, recovers the downlink packet from the network coded packet p using the uplink packet. The MS2 830 uses the downlink packet and the uplink packet to recover ACK bit 0 and bit 1 and transmits a type "B" ACK if any of the recovered ACK bits indicates a NAK. The MS2 830 discards the stored packet corresponding to the recovered ACK bit if the recovered ACK bit indicates an ACK. The MS3 832 knows the echoed uplink ACK and the echoed downlink ACK and acquires the uplink and downlink parity bits, that is, additional parity bits.

Figure 9:
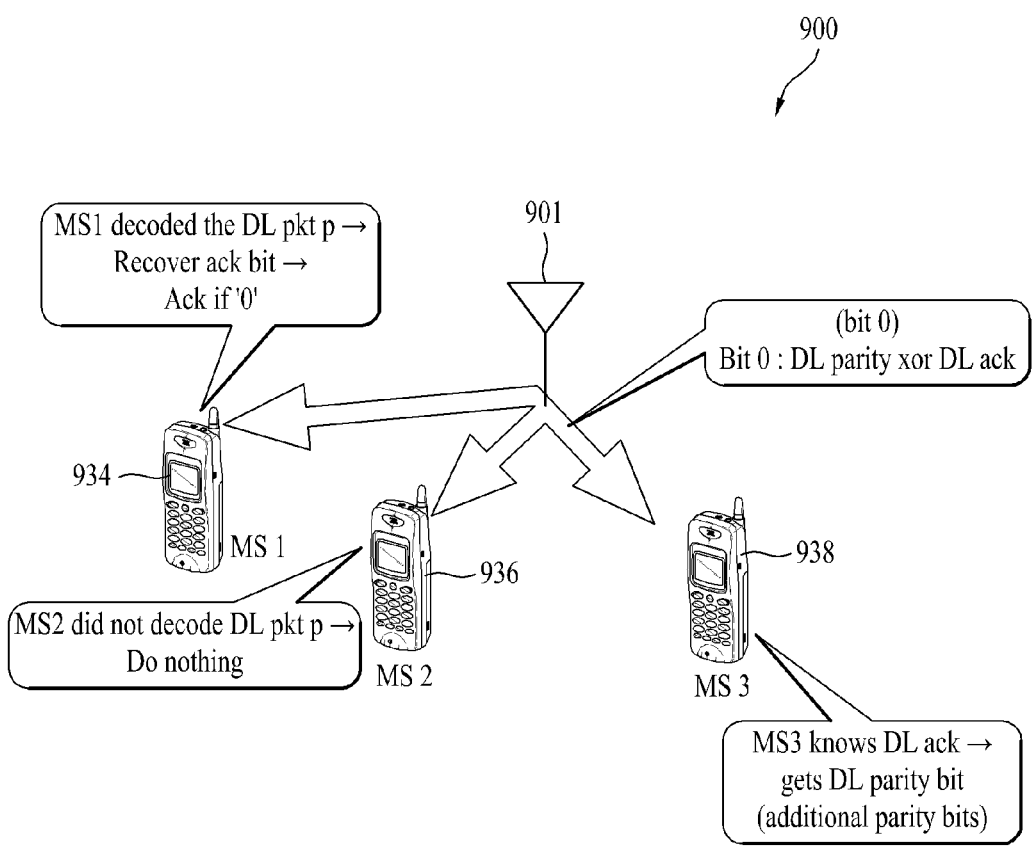
FIG. 9 illustrates a network in which an exemplary ACK/NAK echo for a downlink packet is performed in accordance with one embodiment of the present invention.

FIG. 9 illustrates a network 900 in which an exemplary ACK/NAK echo for a downlink packet p to MS3 938 is performed in accordance with one embodiment of the present invention. Network 900 includes BS 901, MS1 934, MS2 936 and MS3 938.

In FIG. 9, the BS 901 initially transmits a downlink packet p and subsequently transmits a control message with a single network coded bit (bit 0), which can be transmitted with a type "B" ACK, where bit 0 represents a downlink parity bit that is XOR-ed with an echoed downlink ACK. The MS1 934 having overheard and decoded the downlink packet from the BS 901, recovers the ACK bit from the single network coded bit and transmits a type "B" ACK if the recovered ACK bit indicates a NAK. The MS2 936 did not decode the downlink packet from the BS 901 and does nothing. The MS3 938 knows the echoed downlink ACK and acquires the downlink parity bit, that is, an additional parity bit that can be used for decoding downlink packet p.

The forward link overhead is effectively reduced by the disclosed embodiments because the control messages for ACK channel assignments and echoes can also be used for transmitting additional parity bits of the failed packets.

Figure 10A:
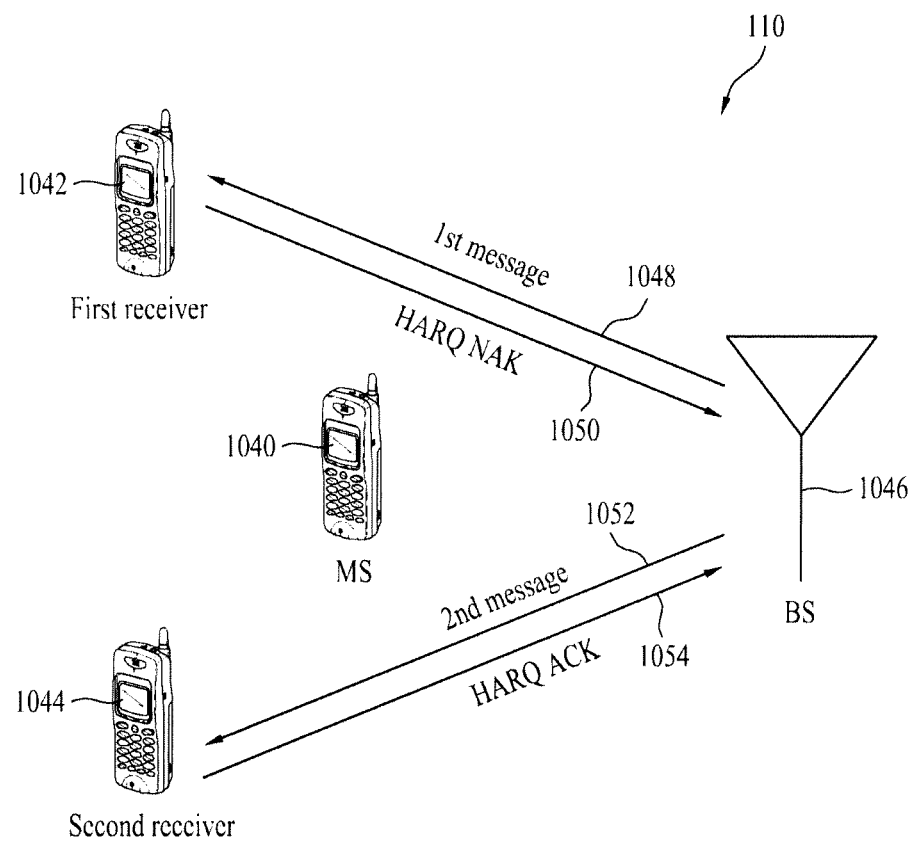
FIGS. 10A through 10C illustrate a network that uses network coded control information for identifying a downlink receiver that will benefit from network coding in accordance with one embodiment of the present invention.
Figure 10B:
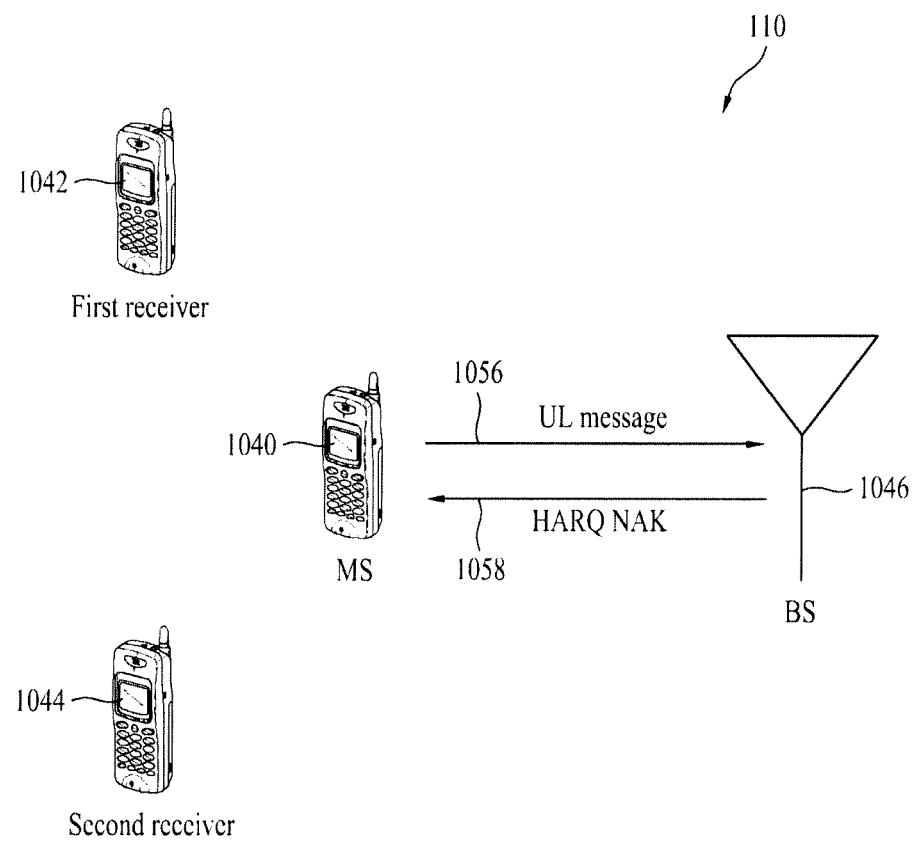
Figure 10C:
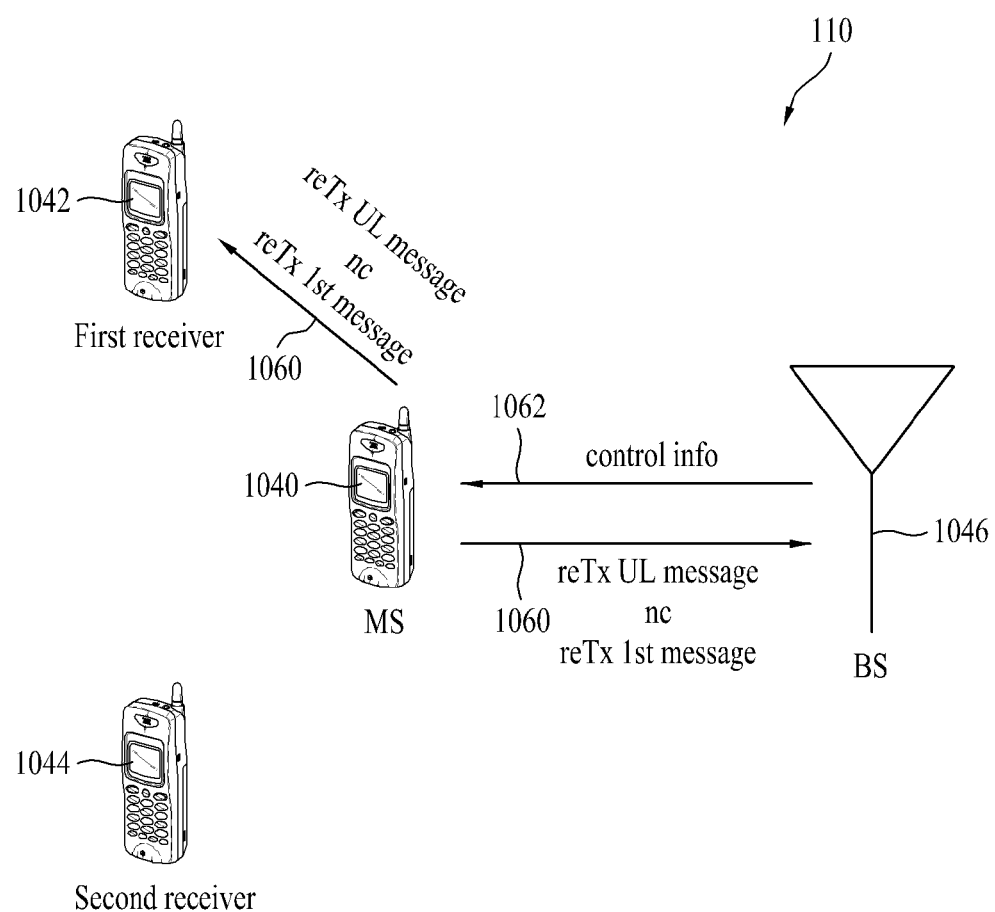

FIGS. 10A through 10C illustrate a network 110 that uses network coded control information for identifying a downlink receiver that will benefit from network coding in accordance with one embodiment of the present invention.

As shown in FIGS. 10A through 10C, the network 110 includes the MS 1040, the first receiver 1042, the second receiver 1044 and the BS 1046. The first receiver 1042 and the second receiver 1044 can each be, for example, a user equipment.

As shown in FIG. 10A, the BS 1046 transmits the 1st message 1048 to the first receiver 1042 and the 2nd message 1052 to the second receiver 1044. The MS 1040 decodes both the 1st message 1048 and the 2nd message 1052. The first receiver 1042 transmits a HARQ NAK message 1050 to the BS 1046, and the second receiver 1044 transmits a HARQ ACK message 1054 to the BS 1046.

Thereafter, as shown in FIG. 10B, the MS 1040 transmits an uplink message 1056 to the BS 1046. The first receiver 1042 and the second receiver 1044 overhear and decode the UL message 1056. The BS 1046, which failed to decode the UL message 1056, transmits a HARQ NAK message to the MS 1040.

Figure 11:
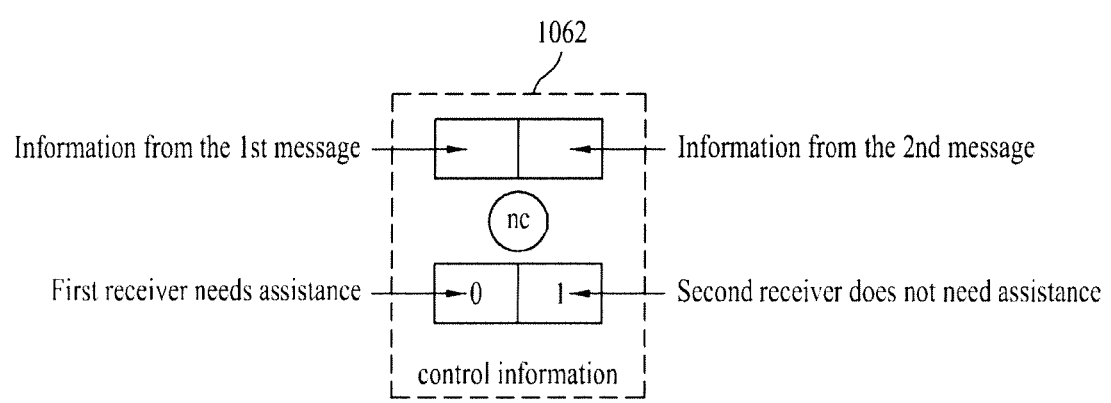
FIG. 11 illustrates control information in accordance with one embodiment of the present invention.

As shown in FIG. 10C, the BS 1046 then transmits control information 1062 to the MS 1040. The MS 1040 can use the control information to determine which of the previously received 1st message 1048 or the previously received 2nd message 1052 should be network coded with the retransmission of its UL message 1056. For example, with reference to FIG. 11, the control information 1062 can be a two-bit binary message where the first bit is generated by network coding ("nc"), for example, by performing an XOR operation on, a portion of the information or a parity bit in the 1st message 1048 and information indicating whether the first receiver needs help, and where the second bit is generated by network coding a portion of the information or a parity bit in the 2nd message 1052 and information indicating whether the second receiver needs help. For example, the portion of the information in the 1st or 2nd messages 1048 and 1052 can be a single binary value, such as "0" or "1."

Therefore, with reference to FIG. 10C, since the first receiver 1042 failed to receive the 1st message 1048 and needs assistance, the control information 1062 can indicate to the MS 1040 that the MS 1040 should network code its retransmission of the uplink message 1056 with the 1st message 1048. The MS 1040 can then transmit the network coded message, such as the network coded message 1060, to the BS 1046 and first receiver 1042. Since the first receiver 1042 previously overheard and knows the uplink message 1056 used to generate the network coded message 1060, the first receiver 1042 can use the uplink message 1056 to recover the 1st message 1048 from the network coded message 1060.

It should be noted that the first receiver 1042 receives one or more additional parity bits from the control information 1062. Moreover, it should also be noted that the receiver which has failed to receive a message, such as the first receiver 1042, receives additional assistance from the control information 1062 regardless of whether the MS 1040 has overheard the message that the receiver failed to receive.

Figure 12A:
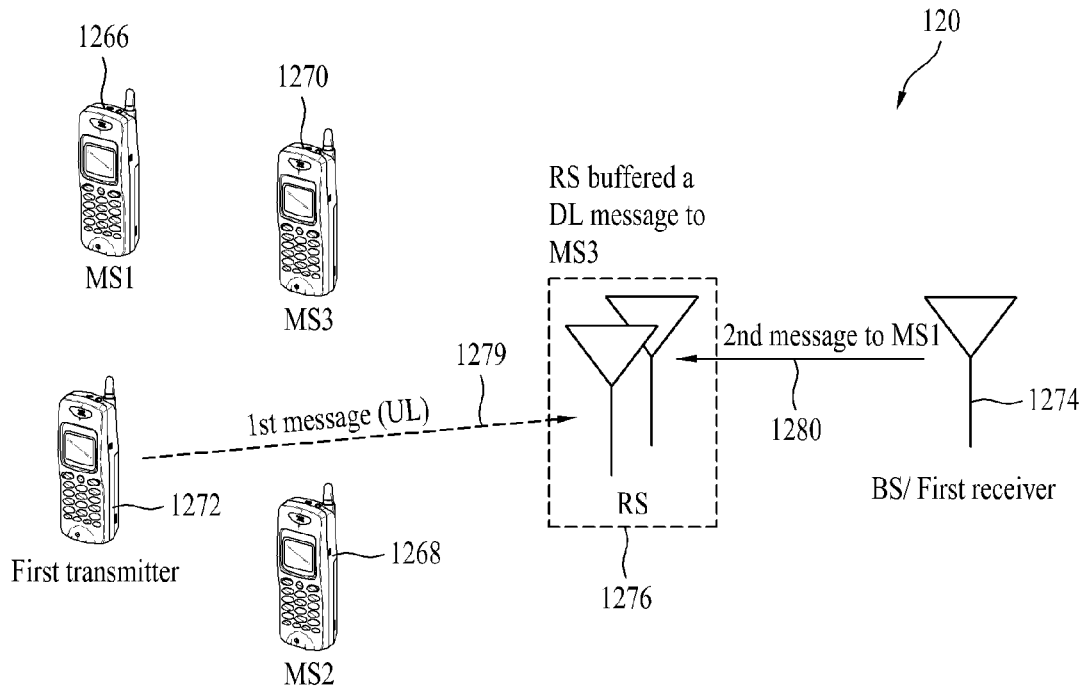
FIGS. 12A through 12C illustrate a network that uses network coded control information for ACK channel assignment in accordance with one embodiment of the present invention.
Figure 12B:
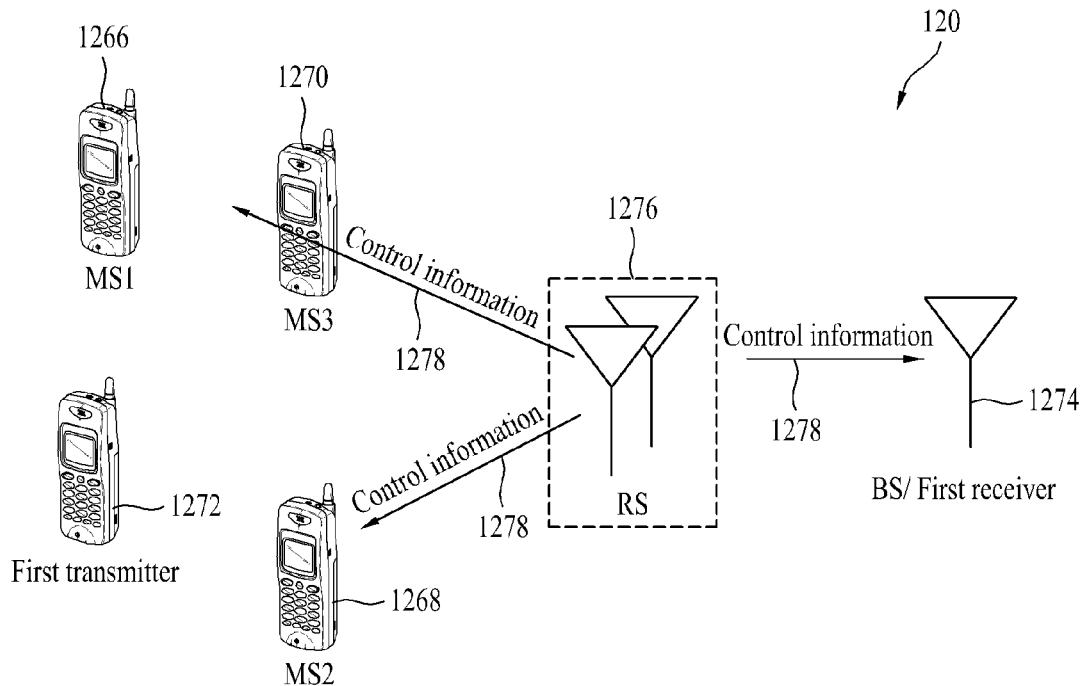
Figure 12C:
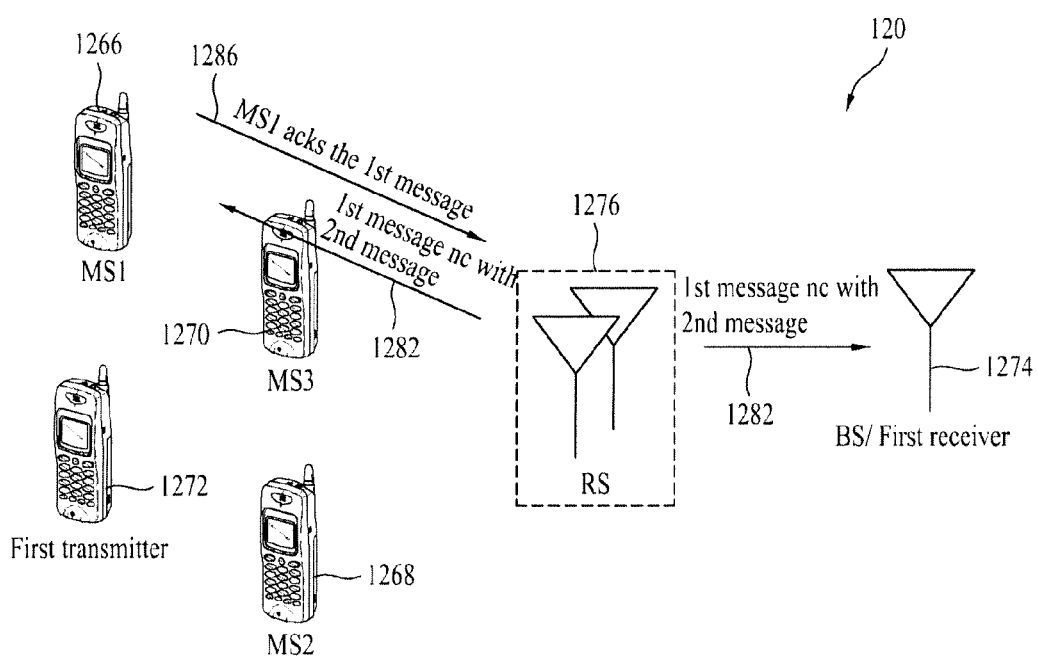

FIGS. 12A through 12C illustrate a network 120 that uses network coded control information for ACK channel assignment in accordance with one embodiment of the present invention. As shown in FIGS. 12A through 12C, the network 120 includes the MS1 1266, the MS2 1268, the MS3 1270, the first transmitter 1272, the first receiver 1274, and the RS 1276. For example, the first transmitter 1272 can be an MS and the first receiver 1274 can be a BS.

In FIG. 12A, the RS 1276 has buffered a downlink message to the MS3 1270. As shown in FIG. 12A, the first transmitter 1272 transmits a 1st message 1279, which can be an uplink message, to the RS 1276. The MS1 1266 overhears and decodes the 1st message 1279. As also shown in FIG. 12A, the first receiver 1274 transmits a 2nd message 1280 intended for the MS1 1266, which is received by the RS 1276.

Figure 13:
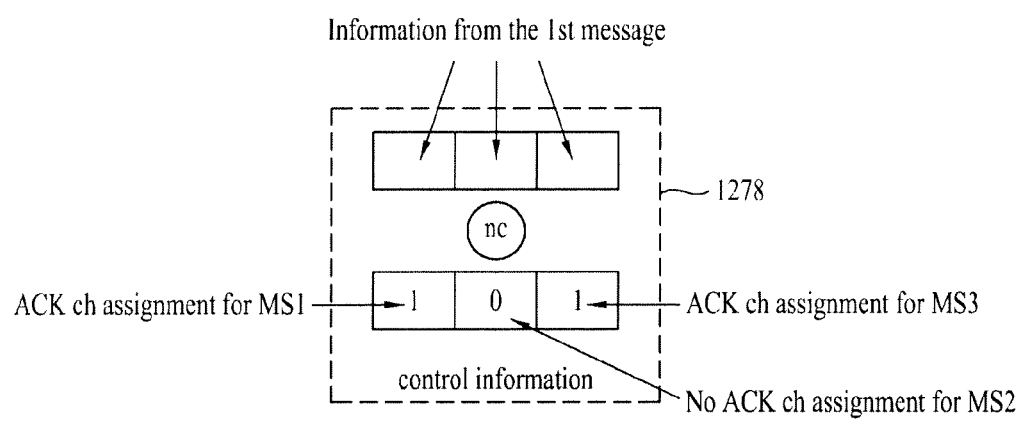
FIG. 13 illustrates control information in accordance with one embodiment of the present invention.

Thereafter, with reference to FIG. 12B, the RS 1276 transmits control information 1278. For example, with reference to FIG. 13, the control information 1278 can be a three-bit binary message where the first bit is generated by network coding (herein also referred to as "nc"), for example, by performing an XOR operation on, a portion of the information or a first parity bit in the 1st message 1279 and information that indicates the ACK channel assignment for MS1 1266 for indicating whether the 1st message 1279 was received by MS1 1266, where the second bit is generated by network coding a portion of the information or a second parity bit in the 1st message 1279 and information that indicates the ACK channel assignment for the MS2 1268 for indicating whether the 1st message 1279 was received by MS2 1268, and where the third bit is generated by network coding a portion of the information or a third parity bit in the 1st message 1279 and information that indicates the ACK channel assignment for the MS3 1270 for indicating whether the 1st message 1279 was received by MS3 1270. For example, the portion of the information in the 1st messages 1279 can be a single binary value, such as "0" or "1."

Each of the ACK channel assignments discussed above with respect to MS1 1266, MS2 1268, and MS3 1270 is based on whether the RS 1276 has buffered a downlink packet transmitted by the BS 1274 to an MS. For example, if the RS 1276 has not buffered a downlink packet transmitted by the BS 1274 to the MS2 1268, the MS2 1268 does not need to indicate whether it has overheard the 1st message 1279 because the RS 1276 would not be able to subsequently generate a bi-directional network-coded message using the 1st message 1279 and the downlink packet transmitted to the MS2 1268.

Therefore, with reference to FIG. 12B, since the MS1 1266 overheard the 1st message 1279, the MS1 1266 can acquire the ACK channel assignment for the 1st message 1279 from the control information 1278. The MS2 1266, which also overheard the 1st message 1279, knows no ACK channel assignment for the 1st message 1279 from the control information 1278. In other words, there is no downlink data from the BS/first receiver 1274. The MS3 1270 did not overhear the 1st message 1279 and, therefore, ignores the ACK channel assignment. In addition, the BS 1274 has knowledge of the MSs, such as the MS1 1266 and the MS3 170, for which it has forwarded downlink packets to the RS 1276. Therefore, based on the knowledge of the MSs and the control information 1278, the BS 1274 can recover a portion of the information or parity bits in the 1st message 1279, which will be forwarded by the RS 1276 in the near future.

With reference to FIG. 12C, the MS1 1266 transmits an ACK message 1286 for the 1st message 1279 to the RS 1276. The MS3 1270 does not transmit any messages because it has not received 1st message 1279, which is interpreted by the RS 1276 as a NAK because the ACK channel is on-off keying. Based on the received ACK, the RS 1276 knows that the buffered downlink message to the MS1 1266 should be network coded with the 1st message 1279, and the RS 1276 generates and transmits the network coded message 1282 including the 1st message 1279 and the 2nd message 1280. Since the MS1 1266 previously overheard and knows the 1st message 1279 that was used to generate the network coded message 1282, the MS1 1266 can use the 1st message 1279 to recover the 2nd message 1280 from the network coded message 1282. Similarly, if the recovered 1st message 1279 at the BS 1274 cannot be decoded, the recovered 1st message 1279 can be combined with the portion of the information or parity bits in the 1st message 1279 recovered from the control information 1278.

Figure 14:
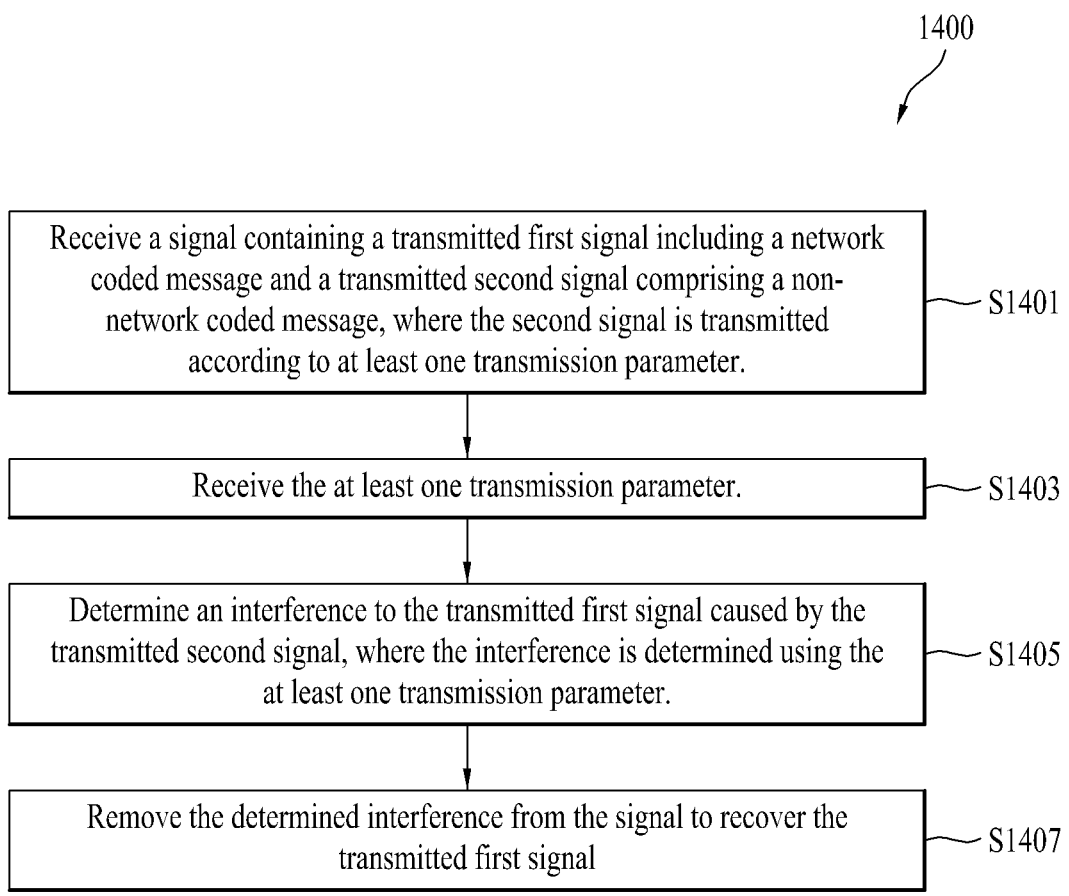
FIG. 14 is a flowchart illustrating a method performed by a BS in accordance with one embodiment of the invention.

FIG. 14 is a flowchart illustrating a method performed by a BS in accordance with one embodiment of the invention. With reference to FIG. 14, the BS receives a signal containing a transmitted first signal including a network coded message and a transmitted second signal including a non-network coded message, where the second signal is transmitted according to at least one transmission parameter (S1401). The BS receives the at least one transmission parameter (S1403) and then determines an interference to the transmitted first signal caused by the transmitted second signal, where the interference is determined using the at least one transmission parameter (S1405). The BS then removes the determined interference from the signal to recover the transmitted first signal (S1407).

Figure 15:
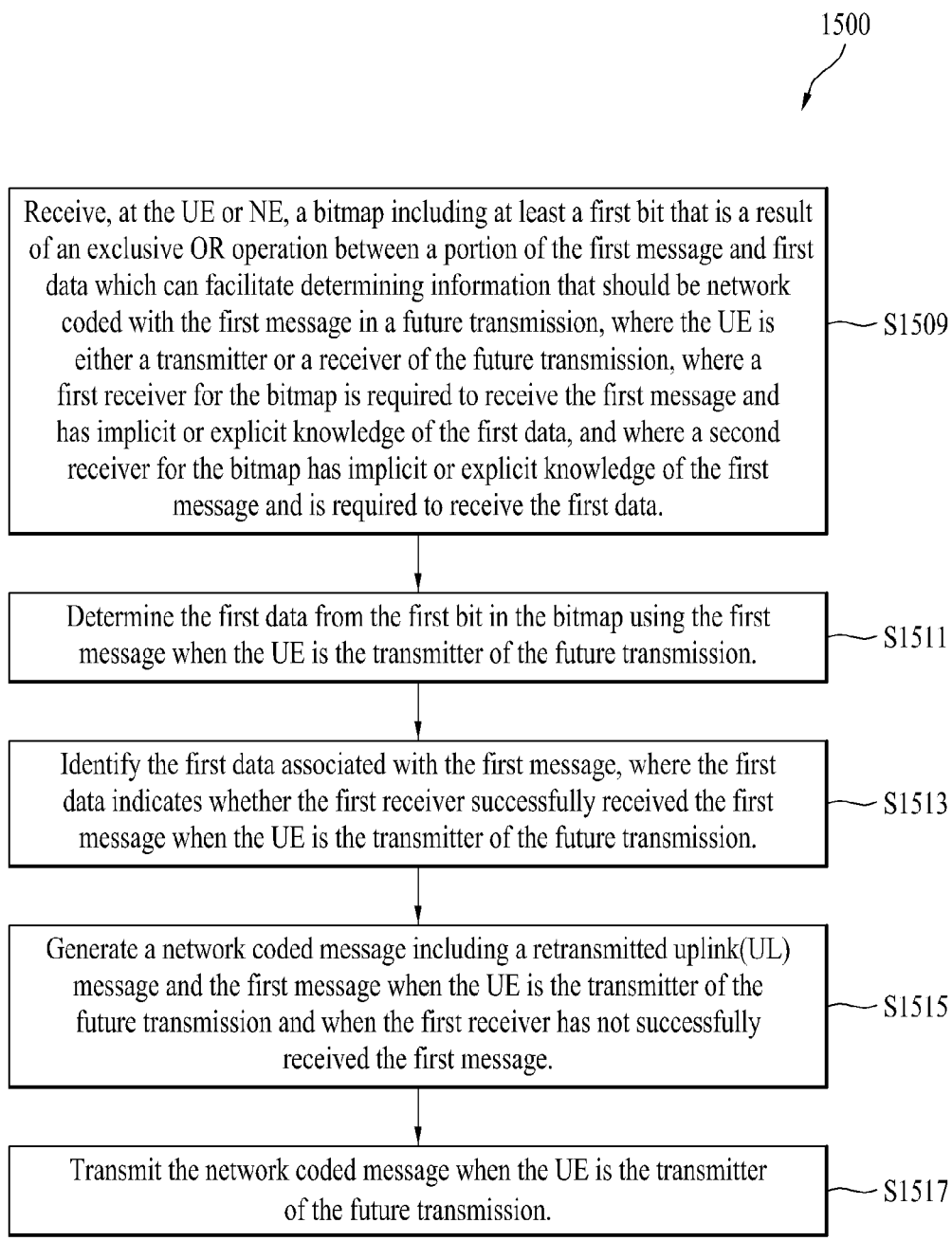
FIG. 15 is a flowchart illustrating a method performed by a BS in accordance with one embodiment of the invention.

FIG. 15 is a flowchart illustrating a method performed by a UE or NE in accordance with one embodiment of the invention. With reference to FIG. 15, the UE or NE receives a bitmap including at least a first bit that is a result of an exclusive OR operation between a portion of the first message and first data which can facilitate determining information that should be network coded with the first message in a future transmission, where the UE is either a transmitter or a receiver of the future transmission, where a first receiver for the bitmap is required to receive the first message and has implicit or explicit knowledge of the first data, and where a second receiver for the bitmap has implicit or explicit knowledge of the first message and is required to receive the first data (S1509).

The UE determines the first data from the first bit in the bitmap using the first message when the UE is the transmitter of the future transmission (S1511). The UE identifies the first data associated with the first message, where the first data indicates whether the first receiver successfully received the first message when the UE is the transmitter of the future transmission (S1513). The UE generates a network coded message including a retransmitted UL message and the first message when the UE is the transmitter of the future transmission and when the first receiver has not successfully received the first message (S1515). The UE then transmits the network coded message (S1517).

Figure 16:
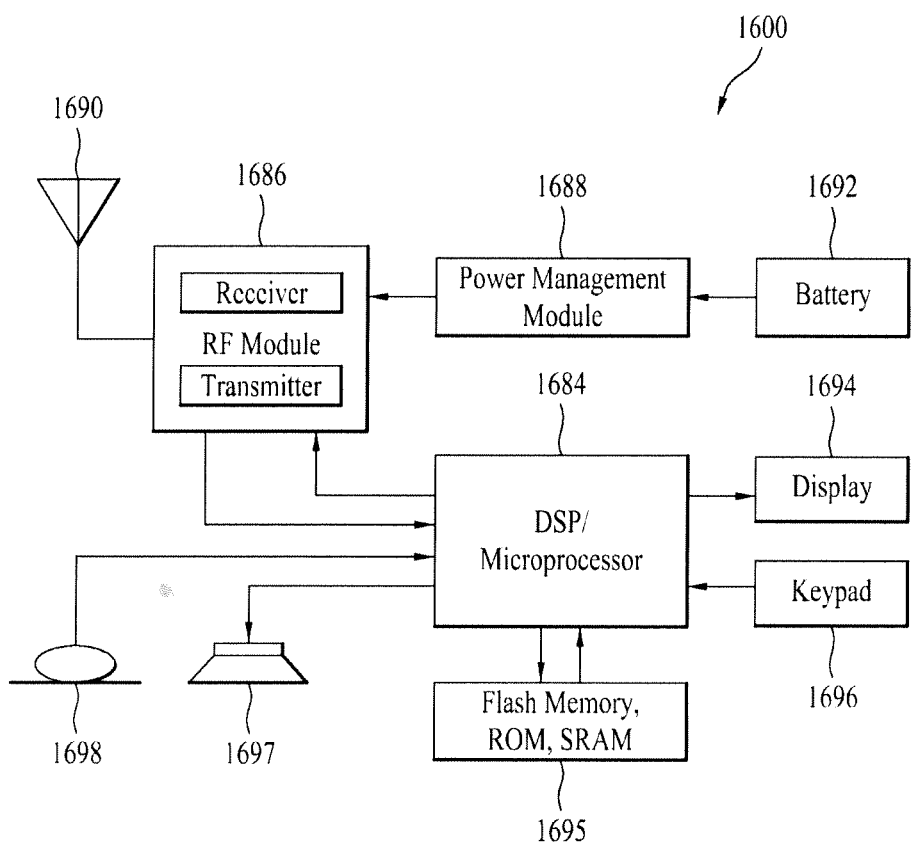
FIG. 16 illustrates a block diagram of a user terminal in accordance with one embodiment of the present invention.

FIG. 16 shows a block diagram of an MS 1600 in accordance with one embodiment of the present invention. The MSs described herein, which are also herein referred to as "user equipments" (UEs), can be configured according to the exemplary MS 1600 discussed below.

The MS 1600 includes a microprocessor (or digital signal processor) 1684, RF module 1686, power management module 1688, antenna 1690, battery 1692, display 1694, keypad 1696, memory 1695, speaker 1697 and microphone 1698.

A user enters instructional information, such as a telephone number, for example, by pushing the buttons of a keypad 1696 or by voice activation using the microphone 1698. The microprocessor 1684 receives and processes the instructional information to perform the appropriate function, such as to dial the telephone number. Operational data may be retrieved from the memory module 1695 to perform the function. Furthermore, the microprocessor 1684 may display the instructional and operational information on the display 1694 for the user's reference and convenience.

The microprocessor 1684 issues instructional information to the RF module 1686, to initiate communication, for example, transmits radio signals including voice communication data. The RF module 1686 includes a receiver and a transmitter to receive and transmit radio signals. An antenna 1690 facilitates the transmission and reception of radio signals. Upon receiving radio signals, the RF module 1686 may forward and convert the signals to baseband frequency for processing by the microprocessor 1684. The processed signals would be transformed into audible or readable information outputted via the speaker 1697, for example. The microprocessor 1684 also includes the protocols and functions necessary to perform the various processes described herein.

It will be apparent to one skilled in the art that the MS 1600 may be readily implemented using, for example, the microprocessor 1684 or other data or digital processing device, either alone or in combination with external support logic. Although the present invention is described in the context of mobile communication, the present invention may also be used in any wireless communication systems using mobile devices, such as PDAs and laptop computers equipped with wireless communication capabilities. Moreover, the use of certain terms to describe the present invention should not limit the scope of the present invention to certain type of wireless communication system, such as UMTS.

It should be noted that the BSs and RSs described herein can alternatively be referred to as network equipment (NE).

The preferred embodiments may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Field Programmable Gate Array (FPGA), Application Specific Integrated Circuit (ASIC), etc.) or a computer readable medium (e.g., magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.). Code in the computer readable medium is accessed and executed by a microprocessor.

The code in which preferred embodiments are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Of course, those skilled in the art will recognize that many modifications may be made to this configuration without departing from the scope of the present invention, and that the article of manufacture may comprise any information bearing medium known in the art.

The logic implementation shown in the figures described specific operations as occurring in a particular order. In alternative implementations, certain logic operations may be performed in a different order, modified or removed and still implement preferred embodiments of the present invention. Moreover, steps may be added to the above described logic and still conform to implementations of the invention.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structure described herein as performing the recited function and not only structural equivalents but also equivalent structures.

What is claimed is:

1. A method performed by a user equipment (UE) or network equipment (NE), the method comprising:
   receiving, at the UE or NE, a bitmap comprising at least a first bit that is a result of an exclusive OR operation between a portion of a first message and first data which can facilitate determining information that should be network coded with the first message in a future transmission,
   wherein the UE is either a transmitter or a receiver of the future transmission, wherein a first receiver for the bitmap is required to receive the first message and has implicit or explicit knowledge of the first data, and wherein a second receiver for the bitmap has implicit or explicit knowledge of the first message and is required to receive the first data.

2. The method of claim 1, wherein when the UE is the transmitter of the future transmission, the method further comprises:
   determining, by the UE, the first data from the first bit in the bitmap using the first message;
   identifying, by the UE, the first data associated with the first message, wherein the first data indicates whether the first receiver successfully received the first message;
   generating, by the UE, a network coded message comprising a retransmitted uplink (UL) message and the first message when the first receiver has not successfully received the first message; and
   transmitting the network coded message.

3. The method of claim 1, wherein the first receiver has previously received an uplink (UL) message, and wherein the first receiver determines the first message from the network coded message using the UL message.

4. The method of claim 1, wherein the first receiver recovers the portion of the first message from the first data in the bitmap.

5. The method of claim 1, wherein when the UE is the receiver of the future transmission, the method further comprises:
  determining, by the UE, an acknowledgment (ACK) channel assignment using the first message, wherein the ACK channel assignment is used to notify a network that the UE has received the first message,
  wherein an acknowledgment or a non-acknowledgement on the ACK channel is indicated using on-off keying;
  transmitting an ACK signal to the network according to the ACK channel assignment; and
  receiving, at the UE, the future transmission comprising a network coded message, wherein the network coded message comprises a second message to the UE and the first message.

6. The method of claim 5, wherein the second receiver has previously transmitted the first message to a relay station, and wherein the UE determines the second message from the network coded message using the first message that was overheard, and wherein the first receiver determines the first message from the network coded message using the second message which the first receiver has previously transmitted to the relay station.

7. The method of claim 6, wherein the first receiver recovers the portion of the first message from the bitmap using data indicating whether a previous transmission from the first receiver occurred.

8. The method of claim 5, wherein the network generates the future transmission based on the ACK signal received by the network.

9. The method of claim 6, wherein the first receiver is a base station (BS).

10. The method of claim 7, wherein the first receiver is a base station (BS).

11. A communication device, comprising:
  a radio frequency (RF) module; and
  a processor configured to cause the RF module to receive a bitmap comprising at least a first bit that is a result of an exclusive OR operation between a portion of a first message and first data which can facilitate determining information that should be network coded with the first message in a future transmission,
  wherein the communication device is either a transmitter or a receiver of the future transmission, wherein a first receiver for the bitmap is required to receive the first message and has implicit or explicit knowledge of the first data, and wherein a second receiver for the bitmap has implicit or explicit knowledge of the first message and is required to receive the first data.

12. The communication device of claim 11, wherein when the communication device is the transmitter of the future transmission, the processor is further configured to:
  determine the first data from the first bit in the bitmap using the first message;
  identify the first data associated with the first message, wherein the first data indicates whether the first receiver successfully received the first message;
  generate a network coded message comprising a retransmitted uplink (UL) message and the first message when the first receiver has not successfully received the first message; and
  cause the RF module to transmit the network coded message.

13. The communication device of claim 11, wherein the first receiver has previously received an uplink (UL) message, and wherein the first receiver determines the first message from the network coded message using the UL message.

14. The communication device of claim 11, wherein the first receiver recovers the portion of the first message from the first data in the bitmap.

15. The communication device of claim 11, wherein when the communication device is the receiver of the future transmission, the processor is further configured to:
  determine an acknowledgment (ACK) channel assignment using the first message, wherein the ACK channel assignment is used to notify a network that the communication device has received the first message,
  wherein an acknowledgment or a non-acknowledgement on the ACK channel is indicated using on-off keying;
  cause the RF module to transmit an ACK signal to the network according to the ACK channel assignment; and
  cause the RF module to receive the future transmission comprising a network coded message, wherein the network coded message comprises a second message to the communication device and the first message.

16. The communication device of claim 15, wherein the second receiver has previously transmitted the first message to a relay station, and wherein the processor is further configured to determine the second message from the network coded message using the first message that was overheard, and wherein the first receiver determines the first message from the network coded message using the second message which the first receiver has previously transmitted to the relay station.

17. The communication device of claim 16, wherein the first receiver recovers the portion of the first message from the bitmap using data indicating whether a previous transmission from the first receiver occurred.

18. The communication device of claim 15, wherein the network generates the future transmission based on the ACK signal received by the network.

19. The communication device of claim 16, wherein the first receiver is a base station (BS).

20. The communication device of claim 17, wherein the first receiver is a base station (BS).

* * * * *